United States Patent
O'Connor et al.

(10) Patent No.: US 9,213,368 B2
(45) Date of Patent: Dec. 15, 2015

(54) EXPANSION CHASSIS FOR LAPTOP COMPUTERS WITH BUS MULTIPLIER AND MULTIFUNCTION USB CABLE

(71) Applicants: Lawrence R. O'Connor, Austin, TX (US); Walter James Dresser, III, Sycamore, IL (US); Ronald Dritlein, III, McHenry, IL (US)

(72) Inventors: Lawrence R. O'Connor, Austin, TX (US); Walter James Dresser, III, Sycamore, IL (US); Ronald Dritlein, III, McHenry, IL (US)

(73) Assignee: New Concepts Development Corp., Woodstock, IL (US)

( * ) Notice: Subject to any disclaimer, the term of this patent is extended or adjusted under 35 U.S.C. 154(b) by 41 days.

(21) Appl. No.: 13/946,701

(22) Filed: Jul. 19, 2013

(65) Prior Publication Data

US 2015/0022965 A1 Jan. 22, 2015

Related U.S. Application Data

(60) Provisional application No. 61/673,890, filed on Jul. 20, 2012.

(51) Int. Cl.
*G06F 1/16* (2006.01)
*G06F 1/20* (2006.01)

(52) U.S. Cl.
CPC .............. *G06F 1/1632* (2013.01); *G06F 1/203* (2013.01)

(58) Field of Classification Search
CPC ................................... G06F 1/616; G06F 1/16
USPC ....................................................... 361/679.45
See application file for complete search history.

(56) References Cited

U.S. PATENT DOCUMENTS

| | | | | |
|---|---|---|---|---|
| 5,107,400 | A * | 4/1992 | Kobayashi | 361/679.37 |
| 5,117,378 | A * | 5/1992 | Ho | 361/679.32 |
| 5,552,959 | A * | 9/1996 | Penniman et al. | 361/679.41 |
| D381,956 | S * | 8/1997 | Naufel | D13/146 |
| 2003/0184962 | A1* | 10/2003 | Kambayashi et al. | 361/683 |
| 2004/0233628 | A1* | 11/2004 | Homer et al. | 361/683 |
| 2005/0168937 | A1* | 8/2005 | Yin et al. | 361/686 |
| 2005/0286219 | A1* | 12/2005 | Kim | 361/686 |
| 2006/0250767 | A1* | 11/2006 | Brophy et al. | 361/686 |

* cited by examiner

*Primary Examiner* — Forrest M Phillips
(74) *Attorney, Agent, or Firm* — Scherrer Patent & Trademark Law, P.C.; Stephen T. Scherrer; Monique A. Morneault

(57) ABSTRACT

The present invention relates to an expansion chassis for a laptop computer. Specifically, the expansion chassis provides additional expansion bays for increased functionality, storage and/or battery power for the laptop computer. One or more BUS multipliers are integrated into a native SATA BUS, and one or more multifunction USB interconnect cables are integrated therein to integrate the expansion chassis into the existing laptop functions.

20 Claims, 3 Drawing Sheets

EXPANSION CHASSIS FOR LAPTOP COMPUTERS WITH BUS MULTIPLIER AND MULTIFUNCTION USB CABLE

TECHNICAL FIELD

The present invention relates to an expansion chassis for a laptop computer. Specifically, the expansion chassis provides additional expansion bays for increased functionality, storage and/or battery power for the laptop computer. One or more BUS multipliers are integrated into a native SATA BUS, and one or more multifunction USB interconnect cables are integrated therein to integrate the expansion chassis into the existing laptop functional architecture.

BACKGROUND

It is, of course, generally known to utilize laptop computers. Indeed, laptop computers provide the functionality of typical desktop computers, but are designed to allow transportability of the same so that the functionality may travel with the user. Typically, users may utilize a laptop computer in any setting so long as the laptop computer has adequate battery power or has access to an electrical receptacle for powering the same.

As computer components become smaller and smaller, the tendency is for laptop computers to become smaller and smaller as well. Indeed, the size of laptop computers are also driven by the need for portability, thereby driving the laptop computers smaller and smaller. In many cases, computer manufacturers must sacrifice functionality, storage capacity, and battery life in an effort to manufacture a laptop computer taking up the smallest space as possible. Specifically, the typical ways to decrease the size of a laptop computer involve sacrificing battery power capacity, storage capacity, and/or connectivity through ports and/or hubs.

Most consumers do not have much choice when selecting a laptop computer, as only a certain number of models are typically produced. Because of the size of the laptop computers, consumers may have to be resigned to getting a specific laptop computer that does not contain the entirety of functionality desired by the consumer. And while desktop computers may include a plurality of expansion bays and expandable capability, due to relaxed limitations on the size of desktop computers, laptop computers typically do not have that luxury. In an effort to ensure that the laptop computer takes up as little space as possible, expansion capability it typically not provided for laptop computers.

In addition, one drawback with providing expansion capabilities for laptop computers is the fact that functional aspects of cables within the laptop computer are typically not expandable. Indeed, even if an expansion bay is provided for a laptop computer, there is no easy means to tie that expansion bay into the existing laptop computer architecture.

A need, therefore, exists for an expansion chassis for a laptop computer that allows expanded capability to the laptop computer. Specifically, a need exists for an expansion chassis for a laptop computer that provides a plurality of expansion bays for providing increased battery capacity, additional storage, additional connection ports/hubs, additional cooling and/or other new or additional capabilities that are not available in existing laptop computers.

Moreover, a need exists for an expansion chassis for a laptop computer that may easily be tied into the existing electronic architecture of the laptop computer. Specifically, a need exists for an expansion chassis for a laptop computer that may parse existing USB function and/or utilize a BUS multiplier to a native SATA BUS, in order to gain additional connection ports or other additional functionality that may be tied to the expansion chassis.

In addition, a need exists for an expansion chassis for a laptop computer that retains existing laptop functionality. Moreover, a need exists for an expansion chassis for a laptop computer that maintains a relatively low profile and does not sacrifice portability of the laptop computer.

SUMMARY OF THE INVENTION

The present invention relates to an expansion chassis for a laptop computer. Specifically, the expansion chassis provides additional expansion bays for increased functionality, storage and/or battery power for the laptop computer. One or more BUS multipliers are integrated into a native SATA BUS, and one or more multifunction USB interconnect cables are integrated therein to integrate the expansion chassis into the existing laptop functions.

To this end, in an embodiment of the present invention, an expansion chassis for a laptop computer is provided. The expansion chassis has at least one expansion bay for increasing the capabilities of the laptop computer, wherein the expansion chassis is electronically tied to the existing architecture of the laptop computer without sacrificing normal functioning of the laptop computer. In an embodiment, the increased capabilities are selected from the group consisting of increased battery capacity, additional storage, additional connection ports or hubs, increased cooling capacity, and combinations of these functions.

It is, therefore, an advantage and objective of the present invention to provide an expansion chassis for a laptop computer that allows expanded capability to the laptop computer.

Specifically, it is an advantage and objective of the present invention to provide an expansion chassis for a laptop computer that provides a plurality of expansion bays for providing increased battery capacity, additional storage, additional connection ports/hubs, additional cooling and/or other new or additional capabilities that are not available in existing laptop computers.

Moreover, it is an advantage and objective of the present invention to provide an expansion chassis for a laptop computer that may easily be tied into the existing electronic architecture of the laptop computer.

Specifically, it is an advantage and objective of the present invention to provide an expansion chassis for a laptop computer that may parse existing USB function and/or utilize a BUS multiplier to a native SATA BUS, in order to gain additional connection ports or other additional functionality that may be tied to the expansion chassis.

In addition, it is an advantage and objective of the present invention to provide an expansion chassis for a laptop computer that retains existing laptop functionality.

Moreover, it is an advantage and objective of the present invention to provide an expansion chassis for a laptop computer that maintains a relatively low profile and does not sacrifice portability of the laptop computer.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not

DETAILED DESCRIPTION OF THE PRESENTLY PREFERRED EMBODIMENTS

The present invention relates to an expansion chassis for a laptop computer. Specifically, the expansion chassis provides additional expansion bays for increased functionality, storage and/or battery power for the laptop computer. One or more BUS multipliers are integrated into a native SATA BUS, and one or more multifunction USB interconnect cables are integrated therein to integrate the expansion chassis into the existing laptop functions.

Figure 1:
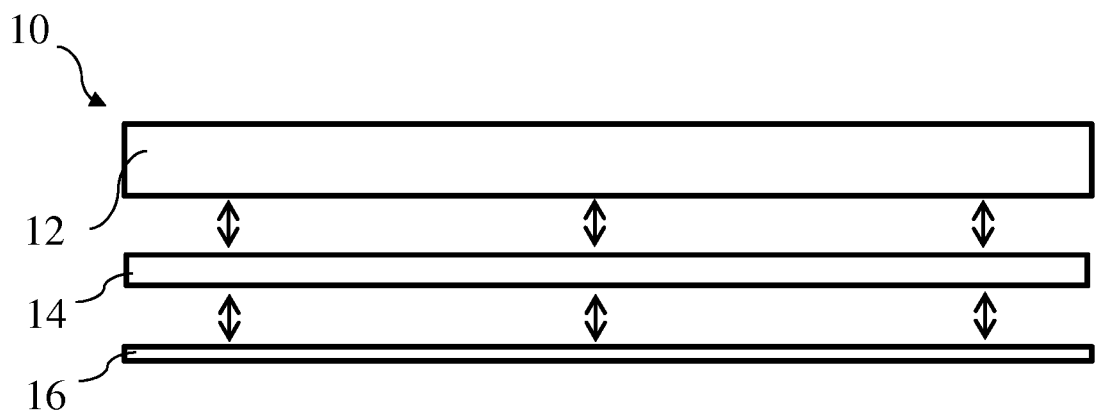
FIG. 1 illustrates a side exploded view of an expansion chassis interconnecting with existing architecture of a laptop computer in an embodiment of the present invention.

Now referring to the figures, wherein like numerals refer to like parts, FIG. 1 illustrates an exploded view of a laptop computer system 10 including a main laptop computer 12, and expansion chassis 14 of the present invention, and a laptop lower case 16. The main laptop computer 12 may be any laptop computer that may be apparent to one of ordinary skill in the art, including PC-based or Apple-based laptop computers, or any other type of laptop. Typically, laptop computers are provided with a lower case or shell 16, which may be removed in accordance with the present invention to expose the electronic architecture of the laptop computer 12. Typically, the lower case may be removed by removing a plurality of screws that bind the lower case 16 to the main laptop computer 12.

Figure 2:
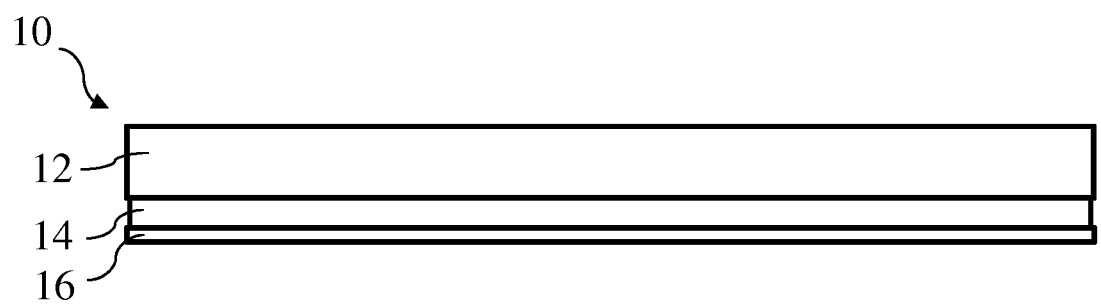
FIG. 2 illustrates a side view of an assembled expansion chassis/laptop computer in an embodiment of the present invention.

As illustrated in FIGS. 1 and 2, the expansion chassis 14 fits between the main laptop computer 12 and the laptop lower case 16. Indeed, the expansion chassis 14 may have a size and profile such that the laptop computer, when assembled as illustrated in FIG. 2, is not radically altered in size, shape, weight and, more importantly, the portability of the laptop computer when fitted with the expansion chassis 14.

When fitted on the underside of the main laptop computer 12, the expansion chassis may be held in place with screws or any other attachment means apparent to one of ordinary skill in the art. The lower case 16 may be placed on an underside of the expansion chassis 14 and connected in place using screws or the like to incorporate the lower case 16 back into the laptop computer. In an alternate embodiment, the bottom surface of the expansion chassis 14 may act as a "lower case" for the laptop computer, and the lower case 16 may not be necessary and may simply be removed and disposed of.

Figure 3:
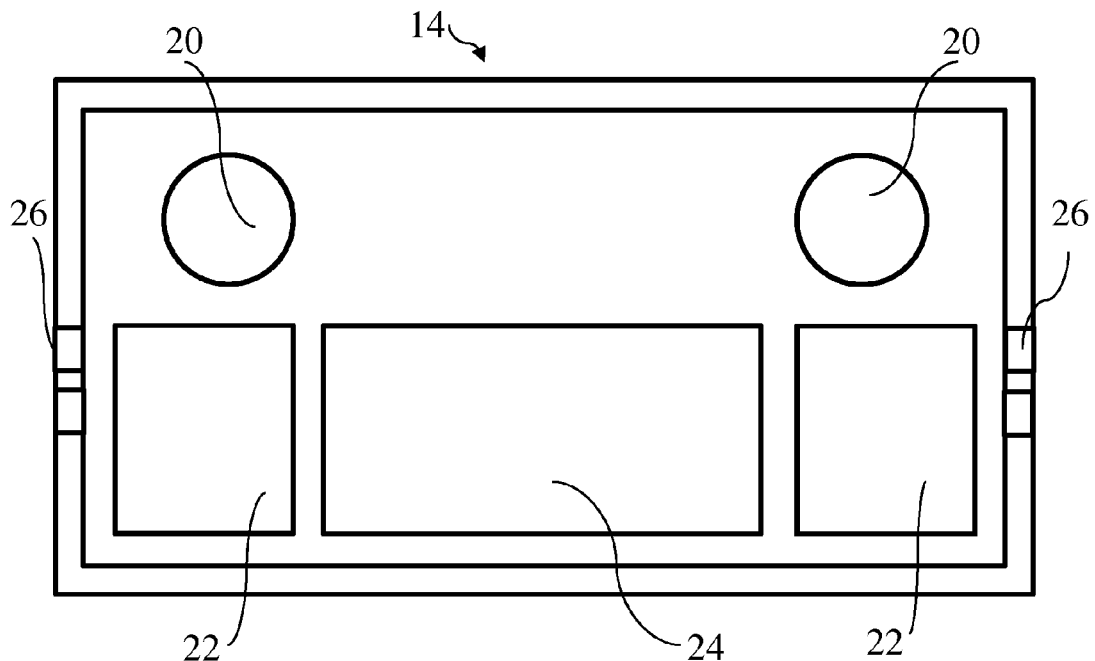
FIG. 3 illustrates a top view of an expansion chassis in an embodiment of the present invention.

FIG. 3 illustrates a top view of a preferred example of an expansion chassis 14 of the present invention. Specifically, the expansion chassis 14 may include a plurality of components, all of which may be provided within the expansion chassis 14 and incorporated into the existing architecture of the laptop computer 14. Specifically, the expansion chassis 14 may include one or more cooling mechanisms 20, such as cooling fans, heat sinks, or other like cooling mechanisms as apparent to one of ordinary skill in the art. The one or more cooling mechanisms 20 may provide additional cooling for the existing architecture of the laptop computer 12 (as overheating tends to be an ongoing issue for laptop computers). In addition or in the alternative, the cooling mechanisms 20 may provide cooling for the additional functionality and capabilities of the expansion chassis 14.

Figure 5:
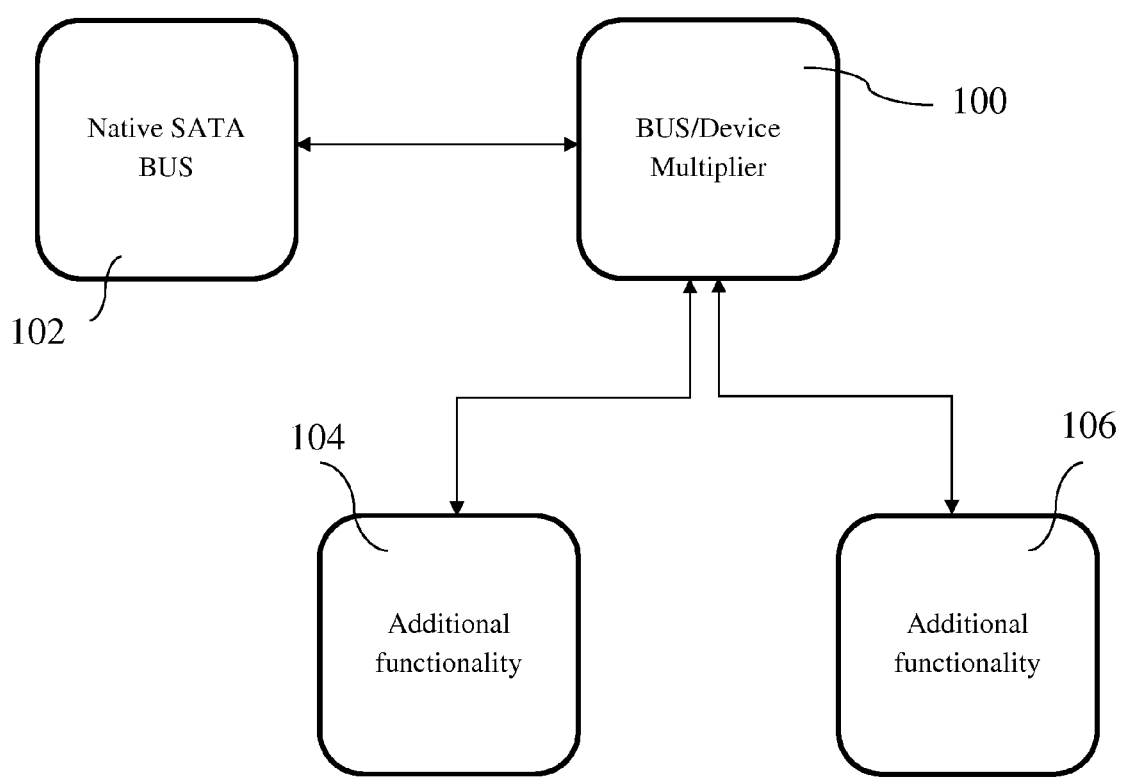
FIG. 5 illustrates a BUS/Device Multiplier for expanding functional capability of a Native SATA Bus in an embodiment of the present invention.

Additional storage devices 22 may also be provided within the expansion chassis 14, as illustrated in FIG. 3. These additional storage devices 22 may include typical hard drive storage apparatuses, such as disc drives and/or solid state drives, as apparent to one of ordinary skill in the art. The storage devices 22 may be tied into the existing electronic architecture of the laptop computer 12, providing increased storage and additional storage options for the laptop computer 12 without sacrificing existing storage capabilities of the laptop computer 12. The storage devices 22 may be tied to the existing laptop computer architecture as illustrated in FIG. 5.

A battery 24 may also be provided in the expansion chassis 14 for increasing the power capacity of the laptop computer. Indeed, in an effort to minimize the size and weight of laptop computers, battery capacity is typically heavily sacrificed. Providing a battery that may be tied into the power capacity of the laptop computer 12 may provide a vast increase in the power capacity of the laptop computer 12, not only providing power for the additional functions and capabilities of the expansion chassis 14, but also increasing the battery life of the laptop computer 12.

Ports and/or hubs 26 may also be provided for providing additional connectivity for the laptop computer 12 for connecting functional add-ons to the laptop computer 12. Typically, laptop computers have a limited amount of ports, typically in the form of USB ports. Thus, the expansion chassis 14 provides additional connectivity, thereby increasing the potential functionality of the laptop computer 12. The additional ports and/or hubs 26 may be interconnected to the existing electronic architecture of the laptop computer 12 without sacrificing the existing port functionality of the laptop computer 12. The additional ports and/or hubs 26 may be tied to the existing architecture of the laptop computer 12 as illustrated in FIG. 4, below.

FIG. 3 illustrates an exemplary configuration of additional functions and capabilities that may be added to an existing laptop computer 12. However, it should be noted that the configuration of the components of the expansion chassis 14 may be changed without affecting the spirit and scope of the present invention. Moreover, additional functions and capabilities may be added through the expansion chassis 14 that may increase the functionality and computer capabilities of the laptop computer that are not shown herein. Finally, the expansion chassis 14 may be modular, in that the user may pick and choose which functions and capabilities to add to the expansion chassis 14, as desired by the user. For example, the user may wish to include more battery capacity and less storage capacity, and may add more battery modules 24 to the expansion chassis 14 at the expense of more storage devices 22. Alternatively, the user may wish to have more storage capacity and less battery capacity, so more storage devices 22 may be added to the expansion chassis 14 at the expense of battery modules 24.

Figure 4:
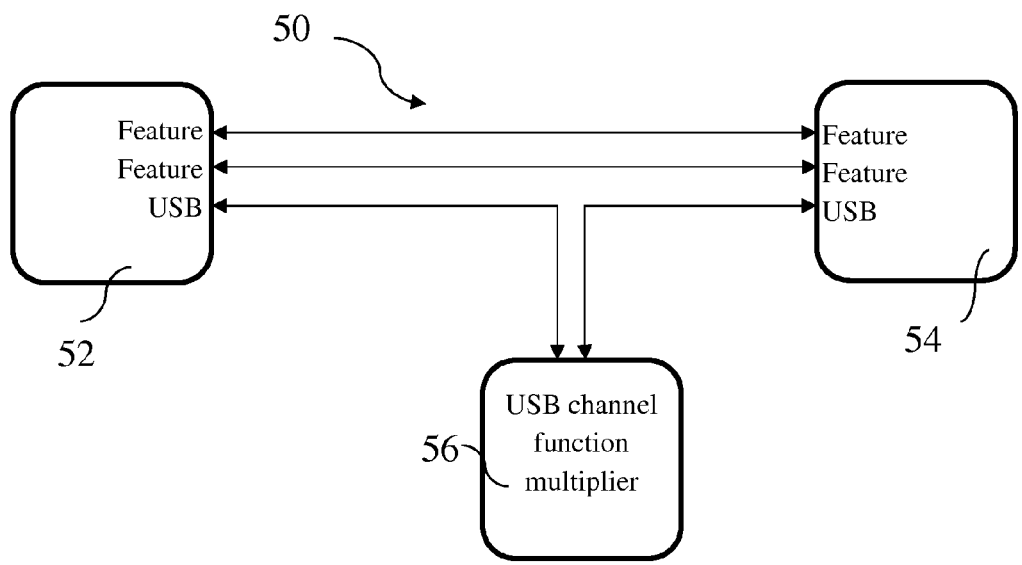
FIG. 4 illustrates a multifunction interconnect USB cable in an embodiment of the present invention.

FIG. 4 illustrates a multifunction interconnect cable 50 that may be utilized to expand the ports and/or hubs of the laptop computer 12, by providing the additional ports and/or hubs 26 on the expansion chassis 14. Because laptop computers typically do not have expansion capabilities, the multifunction interconnect cable 50 may be required in place of existing USB function cables that may be part of the existing laptop architecture. Specifically, a cable that may connect a first existing laptop USB module 52 and a second existing laptop USB module 54 may be removed from the laptop computer. The multifunction interconnect cable 50 may replace the same, providing the electronic connection for the features, as necessary, but parsing the USB function to a USB channel function multiplier 56. The USB channel function multiplier 56 may be tied to the ports and/or hubs 26 of the expansion chassis 14, providing the additional ports and/or hubs, but without sacrificing existing USB capabilities, or other functional capabilities, of the laptop computer.

FIG. 5 illustrates a BUS/Device multiplier 100 that may be utilized to increase the storage capacity (through the additional storage devices 22) or otherwise increase the functionality and/or capabilities of the laptop computer 12 through the native SATA BUS 102 of the laptop computer 12. The BUS/Device multiplier 100 may be tied to the Native SATA BUS 102 thereby increasing the connective and functionality of the Native SATA BUS 102. The BUS/Device multiplier 100 may be tied to at least one or more additional functional modules 104, 106. In the preferred example shown in FIG. 3, the storage devices 22 may be one or more of the additional functional modules 104, 106 and may be tied directly back to the Native SATA BUS 102 through the BUS/Device multiplier 100. Thus, the storage capacity of the laptop computer 12 may be increased through the expansion chassis 14 without sacrificing the existing storage capacity or other functionality of the laptop computer 12. The BUS/Device multiplier 100 may utilize command-based switching or, preferably, FIS (frame information structure)-based switching, as apparent to one of ordinary skill in the art to drive the additional storage devices 22, or other functional modules.

Of course, other functional modules that may be contained in the expansion chassis 14 may be tied into the existing electronic architecture of the laptop computer 12 without departing from the spirit and scope of the present invention. For example, the battery power may be tied directly to the power architecture of the laptop computer 12, thereby increasing the battery capacity of the laptop computer 12.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An expansion chassis for a laptop computer having an internal architecture and a perimeter, the expansion chassis comprising:
   at least one expansion bay that increases at least one capability of the laptop computer without sacrificing normal functioning of the laptop computer;
   wherein the at least one expansion bay is electronically connected to the internal architecture of the laptop computer; and
   wherein the expansion chassis is disposed beneath the architecture of the laptop computer and configured to be physically and electronically connected to the internal architecture of the laptop computer between the internal architecture of the laptop computer and a lower cover, wherein the expansion chassis is further configured to have a perimeter about equal to the perimeter of the laptop computer and to align with the perimeter of the laptop computer when disposed therebeneath.

2. The expansion chassis of claim 1 wherein the architecture of the laptop computer is a Native SATA BUS.

3. The expansion chassis of claim 1 wherein the at least one expansion bay is selected from the group consisting of a battery, a storage device, a connection port, a hub, a cooling mechanism, and any combination thereof.

4. The expansion chassis of claim 1 further comprising:
   holes for connecting the lower cover thereunder.

5. The expansion chassis of claim 1 further comprising:
   a multifunction interconnect cable that replaces an existing port cable within the laptop computer.

6. The expansion chassis of claim 1 further comprising:
   a channel function multiplier that allows use of a plurality of connection ports.

7. The expansion chassis of claim 1 further comprising:
   a device multiplier that allows use of a plurality of expansion bays.

8. A method for expanding functionality of a laptop computer having an internal architecture and a perimeter, the method comprising the steps of:
   providing an expansion chassis having a perimeter that is about equal to the perimeter of the laptop computer comprising at least one expansion bay that increases at least one capability of the laptop computer without sacrificing normal functioning of the laptop computer;
   removing a lower laptop case from the laptop computer;
   connecting electronically the at least one expansion bay to the internal architecture of the laptop computer; and
   connecting the expansion chassis beneath the internal architecture of the laptop computer such that the perimeter of the expansion chassis aligns with the perimeter of the laptop computer.

9. The method of claim 8 further comprising the step of:
   attaching the lower laptop case beneath the expansion chassis.

10. The method of claim 8 further comprising the steps of:
    selecting a type of the at least one expansion bay, wherein the type of the at least one expansion bay is selected from the group consisting of a battery, a storage device, a connection port, a hub, a cooling mechanism, and any combination thereof; and
    inserting the at least one expansion bay within the expansion chassis.

11. The method of claim 8 further comprising the step of:
    replacing an existing port cable with a multifunction interconnect cable.

12. The method of claim 8 further comprising the step of:
    inserting a channel function multiplier that allows use of a plurality of connection ports.

13. The method of claim 8 further comprising the step of:
    inserting a device multiplier that allows use of a plurality of expansion bays.

14. A system for expanding functionality of a laptop computer, the system comprising:
    a laptop computer having an internal architecture, a perimeter and a lower cover disposed on an underside of the laptop computer;
    an expansion chassis having at least one expansion bay that increases at least one capability of the laptop computer without sacrificing normal functioning of the laptop computer;
    wherein the at least one expansion bay is electronically connected to the internal architecture of the laptop computer; and
    wherein the expansion chassis is disposed and connected beneath the internal architecture of the laptop computer wherein the perimeter of the expansion chassis aligns with the perimeter of the laptop computer.

15. The system of claim 14 wherein the architecture of the laptop computer is a Native SATA BUS.

16. The system of claim 14 wherein the at least one expansion bay is selected from the group consisting of a battery, a storage device, a connection port, a hub, a cooling mechanism, and any combination thereof.

17. The system of claim 14 further comprising:
holes for connecting the lower cover thereunder.

18. The system of claim 14 further comprising:
a multifunction interconnect cable that replaces an existing port cable within the laptop computer.

19. The system of claim 14 further comprising:
a channel function multiplier that allows use of a plurality of connection ports.

20. The system of claim 14 further comprising:
a device multiplier that allows use of a plurality of expansion bays.

* * * * *